United States Patent
Minagawa et al.

(10) Patent No.: US 8,991,102 B2
(45) Date of Patent: Mar. 31, 2015

(54) DOOR WEATHER STRIP

(71) Applicants: Toyoda Gosei Co., Ltd., Kiyosu-shi, Aichi-ken (JP); Toyota Jidosha Kabushiki Kaisha, Toyota-shi, Aichi-ken (JP)

(72) Inventors: Yoshihiko Minagawa, Kiyosu (JP); Teruyuki Okajima, Kiyosu (JP); Harumi Kogiso, Kiyosu (JP); Tsuyoshi Miyake, Susono (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/928,847

(22) Filed: Jun. 27, 2013

(65) Prior Publication Data

US 2014/0000174 A1    Jan. 2, 2014

(30) Foreign Application Priority Data

Jun. 28, 2012   (JP) .................................. 2012-145447

(51) Int. Cl.
 *E06B 7/16*  (2006.01)
 *B60J 10/08* (2006.01)
 *E06B 7/23*  (2006.01)

(52) U.S. Cl.
 CPC ............ *E06B 7/2305* (2013.01); *B60J 10/085* (2013.01)
 USPC ......................... 49/479.1; 49/489.1; 49/498.1

(58) Field of Classification Search
 USPC ............ 49/479.1, 484.1, 489.1, 493.1, 498.1
 See application file for complete search history.

(56) References Cited

U.S. PATENT DOCUMENTS

| | | | | |
|---|---|---|---|---|
| 4,894,953 A | * | 1/1990 | Nozaki | 49/440 |
| 4,979,333 A | * | 12/1990 | Goto et al. | 49/483.1 |
| 5,655,333 A | * | 8/1997 | Yamashita | 49/441 |
| 6,964,133 B2 | * | 11/2005 | Aritake et al. | 49/479.1 |
| 2007/0137112 A1 | * | 6/2007 | Furuzawa et al. | 49/489.1 |
| 2011/0219701 A1 | * | 9/2011 | Fukuta et al. | 49/493.1 |

FOREIGN PATENT DOCUMENTS

| | | |
|---|---|---|
| JP | 10-016561 A | 1/1998 |
| JP | 10-324158 A | 12/1998 |
| JP | 11-034759 B2 | 2/1999 |
| JP | 2001-310635 A | 11/2001 |
| JP | 2001-322204 A | 11/2001 |
| JP | 2002-059745 A | 2/2002 |
| JP | 2002-293140 A | 10/2002 |
| JP | 2002-307925 A | 10/2002 |
| JP | 2002-307952 A | 10/2002 |

(Continued)

*Primary Examiner* — Gregory J. Strimbu
(74) *Attorney, Agent, or Firm* — Posz Law Group, PLC

(57) ABSTRACT

A door weather strip for a motor vehicle, which can be readily produced, and readily and securely attached to a corner of a door frame without coming off the same. In an upper side section and an upper side part of a corner section of the door weather strip, the door weather strip includes an exterior weather strip, an interior weather strip and a connecting section. The exterior weather strip includes an exterior base portion for attachment to the door frame or a door molding, and an exterior seal portion for contacting a door opening portion of a vehicle body when a door is closed, and the interior weather strip includes an interior base portion and an interior seal portion. A reinforcing rib is formed in a rear surface of the exterior base portion in the upper side part of the corner section.

6 Claims, 8 Drawing Sheets

(56) References Cited

FOREIGN PATENT DOCUMENTS

| | | |
|---|---|---|
| JP | 2002-316538 A | 10/2002 |
| JP | 2003-034194 A | 2/2003 |
| JP | 2004-027027 A | 1/2004 |
| JP | 2005-014402 A | 1/2005 |
| JP | 2006-096256 A | 4/2006 |
| JP | 2006-151205 A | 6/2006 |
| JP | 2007-153083 A | 6/2007 |
| JP | 2007-191075 A | 8/2007 |
| JP | 2009-006851 A | 1/2009 |
| JP | 2009-051442 A | 3/2009 |
| JP | 2009-067195 A | 4/2009 |
| JP | 2010-036602 A | 2/2010 |
| JP | 2010-052623 A | 3/2010 |
| JP | 2012-011859 A | 1/2012 |

* cited by examiner

FIG. 1
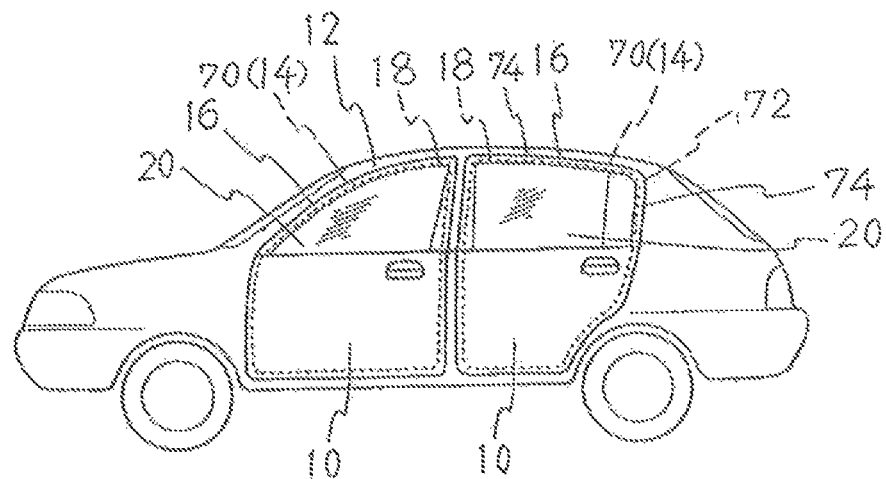
FIG. 2       PRIOR ART
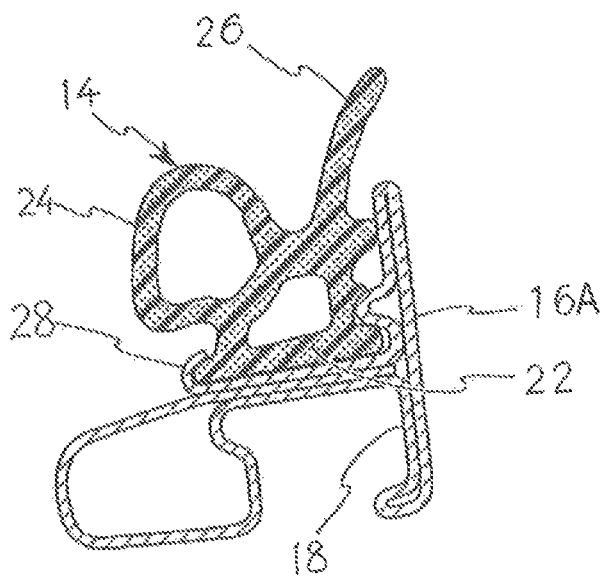

DOOR WEATHER STRIP

CROSS-REFERENCE TO RELATED APPLICATION

This application is related to and claims priority from Japanese patent application No. 2012-145447, incorporated herein by reference.

BACKGROUND OF THE INVENTION

1. Field of the Invention

The present invention relates to a door weather strip for a motor vehicle, which is adapted to effect a seal between a door of the motor vehicle and a door opening portion of a vehicle body.

2. Description of Related Art

As show in FIG. 1, a seal between a door 10 of a motor vehicle and a door opening portion 12 of a vehicle body is effected by a door weather strip 14 attached to an outer periphery of a door frame 16 of the door 10, and/or an opening weather strip attached to a flange of the door opening portion 12. And a seal between a glass door 20 and the door 10 is effected by a glass run attached in a channel 18 provided along an inner periphery of the door frame.

As shown in FIG. 2, conventionally, the door weather strip 14 attached to the outer periphery of a door frame 16A of a first type has been composed of a base portion 22, a tubular seal portion 24 and a seal lip 26. The tubular seal portion 24 and the seal lip 26 are formed on the upper side of the base portion 22 integrally therewith. The base portion 22 is fitted in a retainer 28 having a U-shaped cross-section, which is secured to the outer periphery of the door frame 16. As a result, the base portion 22 is secured to the door frame 16A. When the door 10 is closed, the seal lip 26 contacts an outer side edge of the door opening portion 12 to seal a gap between a peripheral edge of the door frame 16 and the door opening portion 12. And when the door 10 is closed, the tubular seal portion 24 contacts a protrusion of the door opening portion 12 on the interior side of the contacting position of the seal tip 26 to effect a seal between the door 10 and the door opening portion 12.

And, recently, hidden type doors have been frequently used to meet demands for improvement in design of motor vehicles. In a hidden type door, in order to reduce a gap between the door and the door opening portion, the width of an exterior side end of a door frame 16B of a second type is decreased so that, in one example shown in FIG. 3, an exterior part of a door weather strip 30 is required to be reduced by decreasing the width of an exterior vertical wall 32 of an outer panel 34 of the door frame 16B.

In order to attach the door weather strip 30 thus arranged, the width of the exterior vertical wall 32 of the outer panel 34 of the door frame 16B is decreased, and a door molding 36 that also acts as a retainer for the door weather strip 30 is attached to the door frame 16B. In this example, the door weather strip 30 is arranged such that an exterior weather strip 38 and an interior weather strip 40 are separately formed, and that exterior weather strip 38 with decreased dimensions is attached to the door molding 36. And a seal portion of the exterior weather strip 38 is made small as a seal lip portion with a lip-like configuration, whereas the interior weather strip 40 is located downwardly of the exterior weather strip 38, and is attached to an interior side of the door frame 16B with an interior base portion 44 while effecting a seal with a tubular seal portion 46 (Publication of Japanese Patent application No. 2007-191075, for example,).

In this example, in order to attach the exterior weather strip 38 of the door weather strip 30 to the door frame 16B, an exterior base portion 48 of an upper side section and a vertical side section of the door weather strip 30 is composed of a solid material, and is fitted in a retainer 50 that is provided by bending the door molding 36. In corner sections that are formed by molding, however, the seal lip 42 must be composed of a sponge material in view of its sealing properties so that it is difficult to compose the exterior base portion 48 of the door weather strip 30 of a solid material.

In another example shown in FIG. 4, only an interior weather strip 52 of a door weather strip 54 is cut away from at least one of an upper side section 56 and a vertical side section 58 thereof, and then the upper side section 56 and the vertical side section 58 are joined to each other, thereby defining a corner section 60 (Publication of Japanese Patent application No. 2009-6851, for example.).

In this example, an exterior base portion 62 of the exterior weather strip 64 is composed of a solid material, and this solid base portion 62 can be extended to the corner section 60. As a result, the strength of the corner section 60 can be enhanced to prevent the corner section 60 from coming off a door sash.

In addition, an insert 66 has been embedded in one part of the corner section 60.

However, the process of cutting away only the interior weather strip 52 except for the exterior weather strip 64, and the process of inserting the insert 66 become complex to take time and labor.

SUMMARY OF THE INVENTION

Accordingly, it is an object of the present invention to provide a door weather strip for a motor vehicle, which can be readily produced, and can be readily and securely attached to a corner of a door frame without coming off the same.

In order to achieve the above-described object, according to a first aspect of the present invention, a door weather strip for sealing between a door of a motor vehicle and a door opening portion of a vehicle body, which is adapted to be attached to an outer periphery of a door frame of the door, includes an upper side section formed by extrusion and adapted to be attached to an upper side of the door frame, a vertical side section formed by extrusion and adapted to be attached to a vertical side of the door frame, and a corner section adapted to join the upper side section and the vertical side section to each other by molding.

Each of the upper side section and an upper side part of the corner section of the door weather strip includes an exterior weather strip adapted to be attached to an exterior part of the door frame to provide a seal against an exterior part of the door opening portion, an interior weather strip adapted to be attached to an interior part of the door frame to provide a seal against an interior part of the door opening portion, and a connecting section for integrally connecting the exterior weather strip and the interior weather strip to each other.

The exterior weather strip includes an exterior base portion for attachment to the door frame or a door molding, and an exterior seal portion for contacting the door opening portion when the door is closed, and the interior weather strip includes an interior base portion for attachment to the door frame, and an interior seal portion for contacting the door opening portion inwardly of a position in which the exterior seal portion contacts when the door is closed. And a reinforcing rib is further formed in a rear surface of the exterior base portion for attachment to an upper side part of the corner of the door frame.

With the arrangement of the first aspect, the door weather strip includes an upper side section formed by extrusion and adapted to be attached to an upper side of the door frame, a vertical side section formed by extrusion and adapted to be attached to a vertical side of the door frame, and a corner section adapted to join the upper side section and the vertical side section to each other by molding. The upper side section and the vertical side section can be efficiently produced by extrusion. The corner section can be formed by molding to conform to the configurations of a corner of the vehicle door, thereby providing a seal therealong. As a result, the corner section joins the upper side section and the vertical side section to each other, thereby providing a seal over an entire circumference of a periphery of the vehicle door.

Each of the upper side section and an upper side part of the corner section includes an exterior weather strip adapted to be attached to an exterior part of the door frame to provide a seal against an exterior part of the door opening portion, an interior weather strip adapted to be attached to an interior part of the door frame to provide a seal against an interior part of the door opening portion, and a connecting section for integrally connecting the exterior weather strip and the interior weather strip to each other.

Therefore, a double seal can be effected with the exterior weather strip and the interior weather strip. In addition, since these weather strips are connected to each other via the connecting section so that by respectively attaching the interior weather strip and the exterior weather strip with the interior base portion and the exterior base portion, they can be securely attached together.

Furthermore, the height of the exterior weather strip can be decreased to reduce a gap between the door opening portion and the exterior side end of the door molding, thereby improving the appearance therearound, and effecting a secure seal between the door frame and the door opening portion.

The exterior weather strip includes an exterior base portion for attachment to the door frame or a door molding, and an exterior seal portion for contacting the door opening portion when the door is closed. Therefore, when the exterior base portion is attached to the door frame or the door molding, the exterior weather strip becomes stable so that the exterior seal portion can securely contact and seal the exterior part of the door opening portion.

The interior weather strip includes an interior base portion for attachment to the door frame, and an interior seal portion for contacting the door opening portion inwardly of a position in which the exterior seal portion contacts when the door is closed. Therefore, when the interior base portion is attached to the door frame, the interior weather strip becomes stable so that the interior seal portion can securely contact and seal the interior part of the door opening portion. In addition, the exterior seal portion and the interior seal portion can provide a double seal between the door frame and the door opening portion.

Since the reinforcing rib is formed in a rear surface of the exterior base portion for attachment to the upper side part of the corner, the strength of the base portion in the corner section can be ensured without removing most part of an extruded part from the corner section, nor embedding any insert. Consequently, the exterior weather strip can be prevented from coming off a sash in the corner of the door frame.

According to a second aspect of the present invention, the reinforcing rib is formed in the rear surface of the exterior base portion with a lattice-like configuration.

With the arrangement of the second aspect of the present invention, the reinforcing rib is formed in the rear surface of the exterior base portion with a lattice-like configuration so that the exterior base portion can exhibit sufficient strength in both a longitudinal direction and a width direction thereof, and consequently, the exterior base portion of the exterior weather strip can be prevented from coming off the sash in a corner of the door frame.

According to a third aspect of the present invention, the reinforcing rib includes a plurality of ribs, each extending in a width direction of the rear surface of the exterior base portion.

With the arrangement of the third aspect of the present invention, the reinforcing rib includes a plurality of ribs, each extending in a width direction of the rear surface of the exterior base portion so that the exterior base portion can exhibit sufficient strength in a width direction thereof, whereby the exterior base portion of the exterior weather strip can be prevented from coming off the sash in the corner of the door frame.

According to a fourth aspect of the present invention, each of the exterior base portion of the upper side section and the exterior base portion of an upper side part of the corner section has an exterior engaging part and an interior engaging part which are formed along both sides of the rear surface thereof so as to extend in a longitudinal direction thereof, and project downwardly, and a sub-reinforcing rib is formed along an interior side surface of the interior engaging part of the exterior base portion for attachment to the upper side part of the corner of the door frame.

With the arrangement of the fourth aspect of the present invention, each of the exterior base portion of the upper side section and the exterior base portion of an upper side part of the corner section has an exterior engaging part and an interior engaging part which are formed along both sides of the rear surface thereof so as to extend in a longitudinal direction thereof, and project downwardly. Therefore, the rigidity of the exterior base portion can be improved, and when the exterior base portion is attached to the door frame or the door molding, the exterior engaging part and the interior engaging part engage with the door frame or the door molding, and contact the same, thereby providing a seal between the door frame and the exterior base portion or between the door molding and the exterior base portion.

A sub-reinforcing rib is formed along an interior side surface of the interior engaging part of the exterior base portion for attachment to the upper side part of the corner of the door frame so that the rigidity of the exterior base portion can be further improved, and the flexing and deformation of the interior engaging part of the exterior base portion can be reduced, and consequently, the exterior base portion can prevent the exterior base portion of the exterior weather strip from coming off the sash of the corner of the door frame.

According to a fifth aspect of the present invention, the corner section of the door weather strip is composed of a sponge material with a Young's modulus of ranging from 0.84 to 0.88 and a specific gravity ranging from 0.61 to 0.65.

With the arrangement of the fifth aspect of the present invention, the corner section of the door weather strip is composed of a sponge material with a specific gravity ranging from 0.61 to 0.65 so that the flexibility of the corner section of the door weather strip can be enhanced, and the weight thereof can be reduced, thereby contributing to a reduction in weight of the motor vehicle.

Since the Young's modulus of the sponge material ranges from 0.84 to 0.88, even the sponge material can exhibit sufficient rigidity and sufficient modulus of elasticity, thereby preventing the abnormal deformation of the exterior base portion, so that the exterior base portion can prevent the exterior weather strip from coming off the sash of the corner of the door frame.

According to a sixth aspect of the present invention, the exterior seal portion is composed of a sponge material and has a lip-shaped configuration, whereas the interior seal portion is composed of a sponge material and has a tubular configuration.

With the arrangement of the sixth aspect of the present invention, the exterior seal portion is composed of a sponge material and has a lip-shaped configuration so that the lip-shaped exterior seal portion exhibiting flexibility can securely close a gap between the door frame and the door opening portion, and a closing force of a door can be decreased.

Since the interior seal portion is composed of a sponge material and has a tubular configuration, the contacting area against the door opening portion becomes large so that where the assembling state of the door scatters, the interior seal portion can contact and seal the door opening portion securely.

According to a seventh aspect of the present invention, at least one part of the exterior base portion and the interior base portion of the upper side section of the door weather strip is composed of a solid material.

With the arrangement of the seventh aspect of the present invention, since at least one part of the exterior base portion and the interior base portion of the upper side section of the door weather strip is composed of a solid material, the rigidity of the exterior base portion and the interior base portion can be enlarged so that they can be prevented from coming off the door frame.

The exterior base portion and the interior base portion of the upper side section of the door weather strip can be simultaneously formed by extrusion using the solid material and the sponge material, thereby facilitating the production of these portions.

In accordance with the present invention, since the reinforcing rib is formed in a rear surface of the exterior base portion for attachment to the upper side part of the corner of the door frame, the strength of the base portion in the corner section can be ensured without removing most part of an extruded part from the corner section, nor embedding any insert. Consequently, the exterior weather strip can be prevented from coming off the sash in the corner of the door frame.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 1 is a side view of a motor vehicle;
FIG. 2 is a cross-sectional view of an upper side section of one example of a conventional door weather strip.

DETAILED DESCRIPTION OF THE PREFERRED EMBODIMENTS

Figure 3:
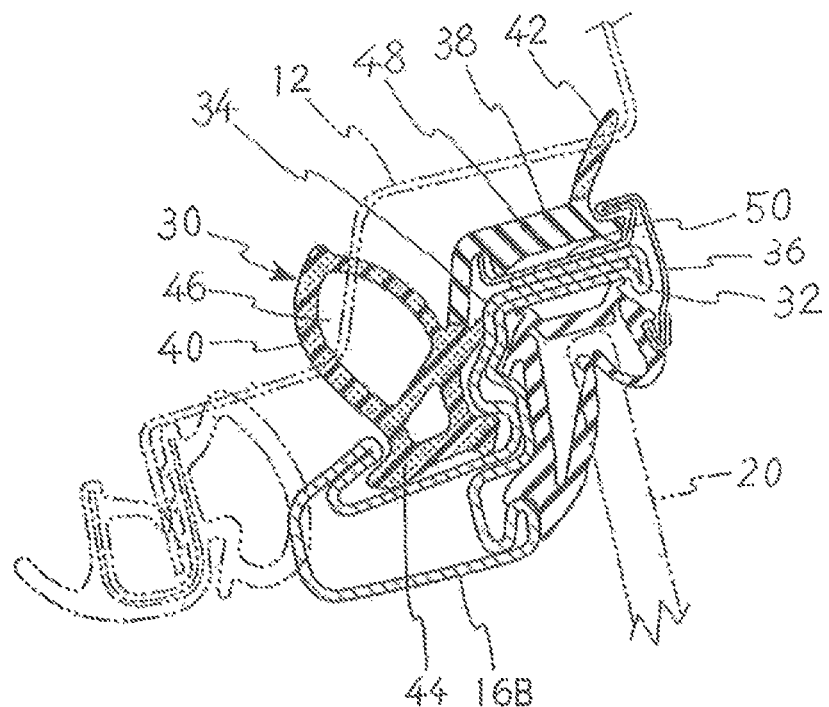
FIG. 3 is a cross-sectional view of an upper side section of another example of a conventional door weather strip.
Figure 4:
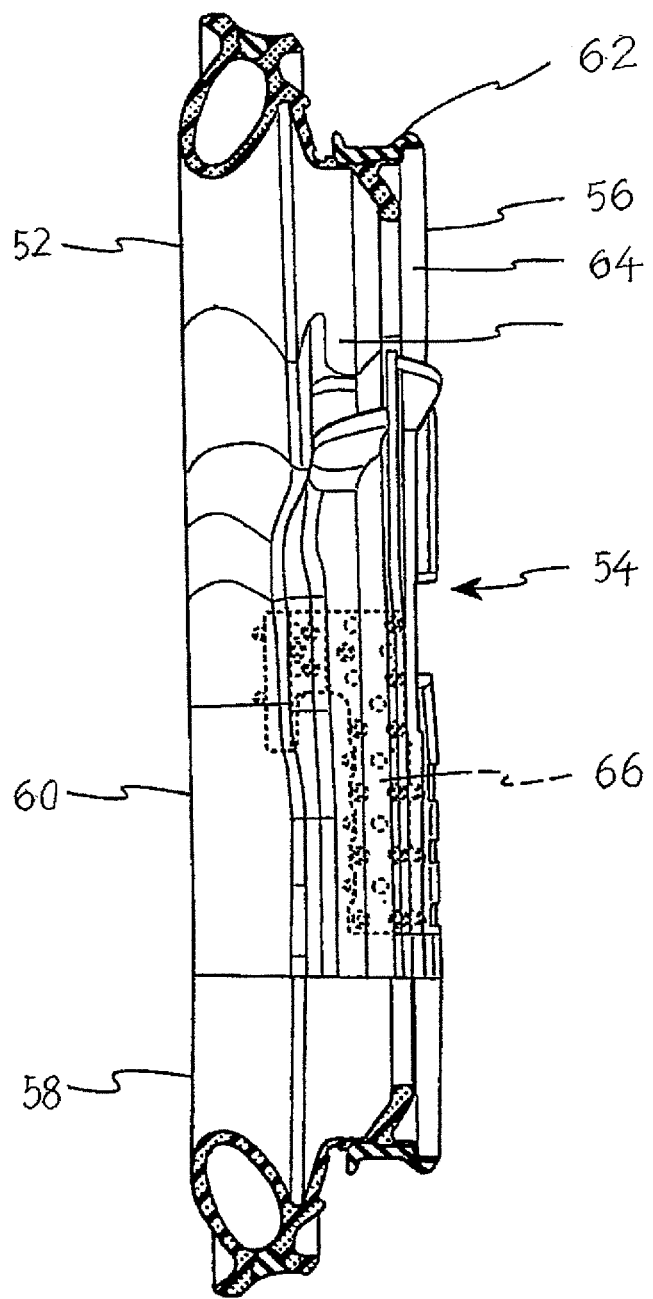
FIG. 4 is a perspective view of a corner section of still another example of a conventional door weather strip.

One embodiment of the present invention will be explained with reference to FIGS. 1, 5 through 9.

FIG. 1 is a side view of a motor vehicle. As shown, a door frame 16 is provided along an outer periphery of an upper part of each of front and rear doors 10 of the motor vehicle, and a door glass 20 is attached to the door frame 16 so as to be raised and lowered therealong. A door weather strip 70 is attached along an outer periphery of the door frame 16 to effect a seal between the door 10 and a door opening portion 12.

Figure 5:
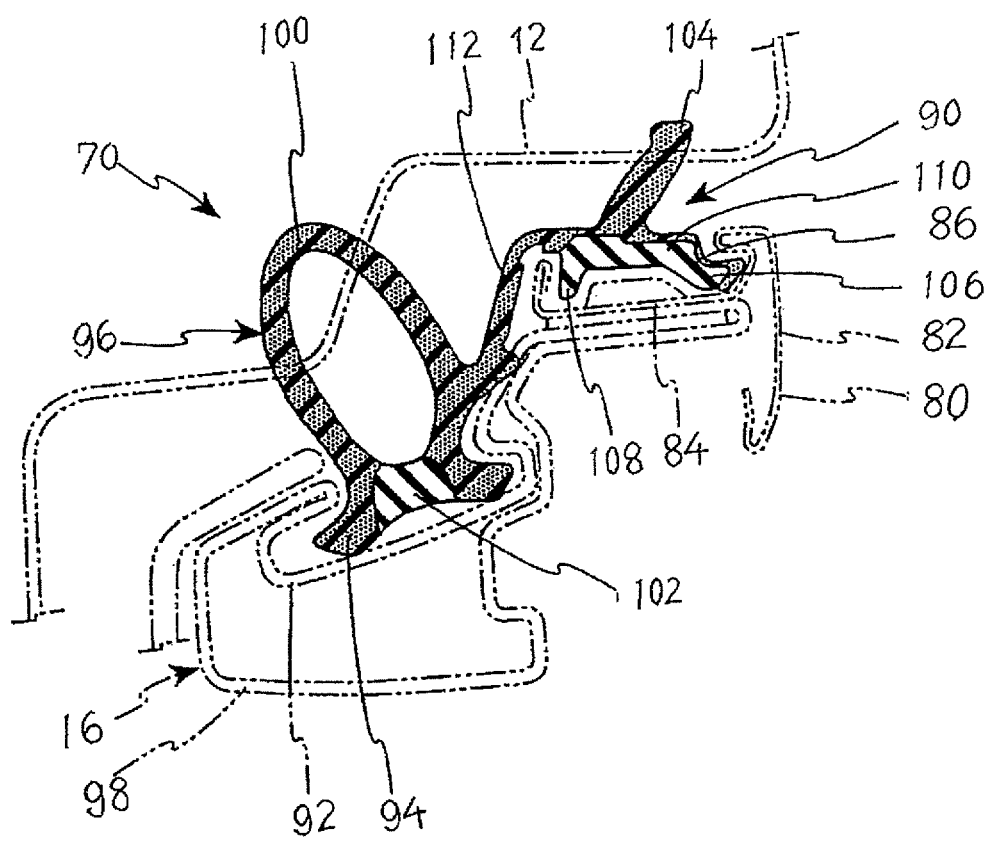
FIG. 5 is a cross-sectional view of an upper side section of one embodiment of a door weather strip in accordance with the present invention, which is taken along line 5-5 of FIG. 7.
Figure 6:
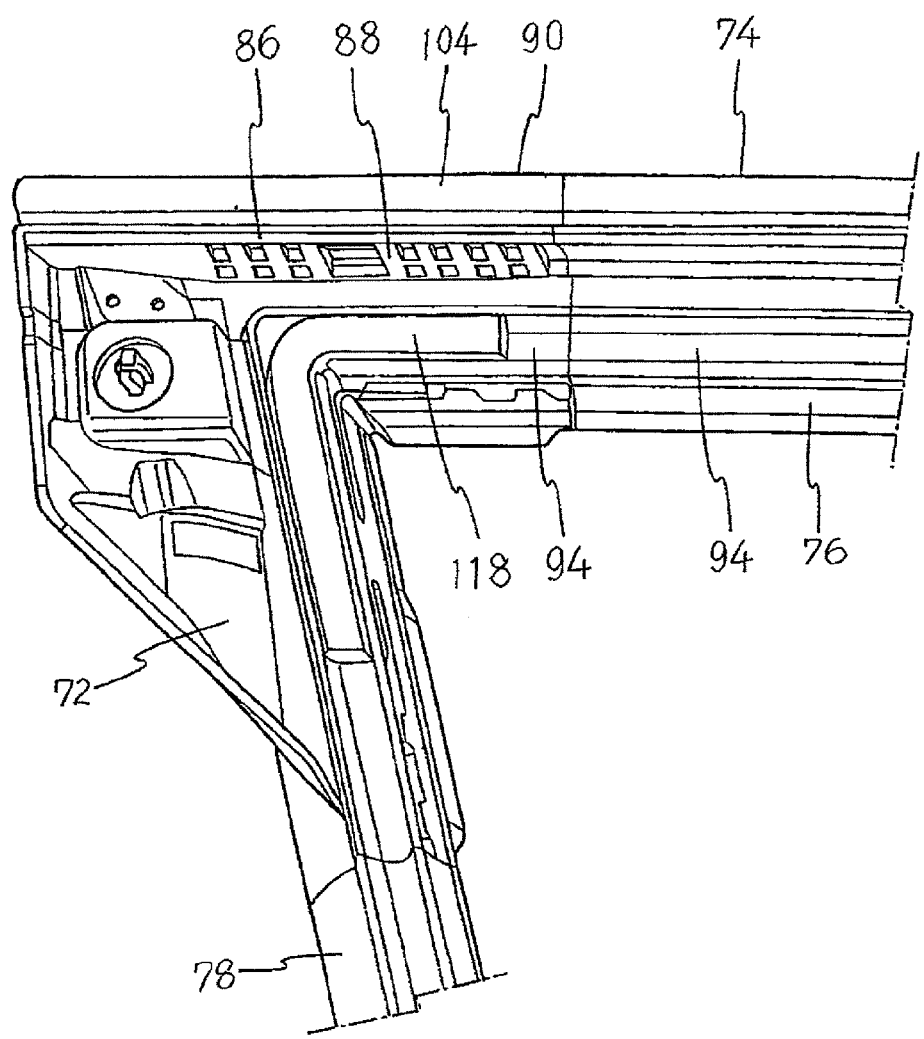
FIG. 6 is a rear view of a corner section of one embodiment of a door weather strip in accordance with the present invention.
Figure 7:
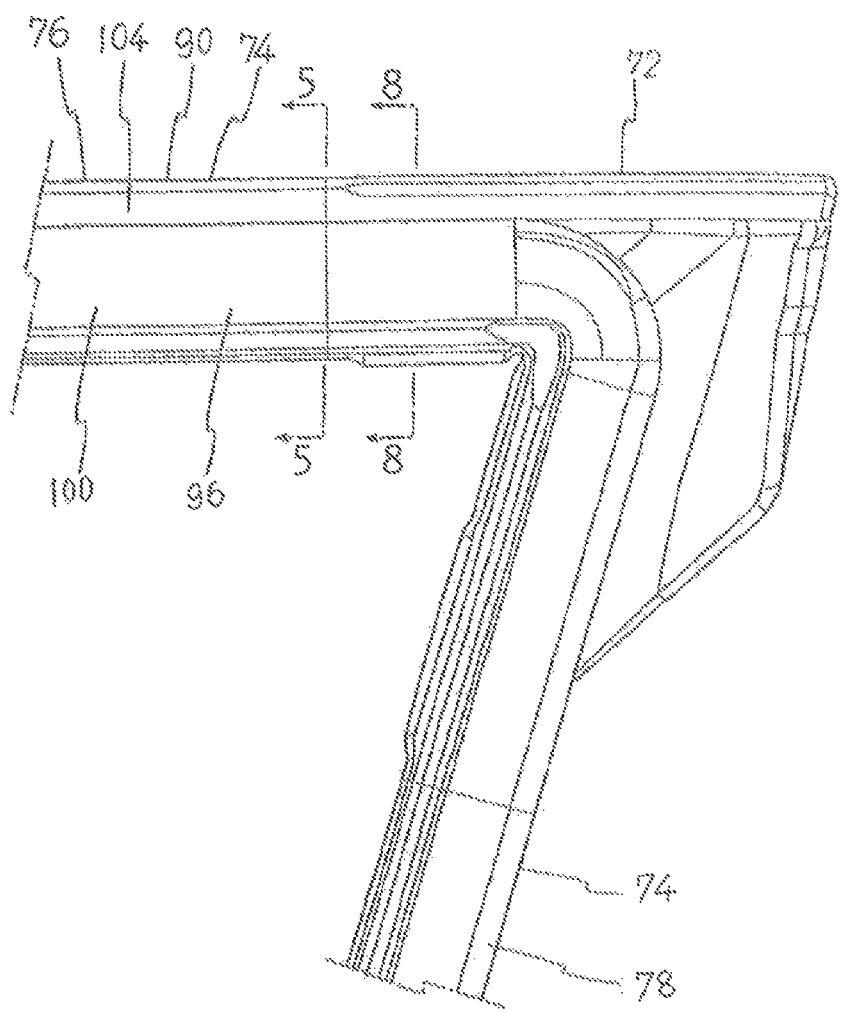
FIG. 7 is a plan view of a corner section of one embodiment of a door weather strip in accordance with the present invention.
Figure 8:
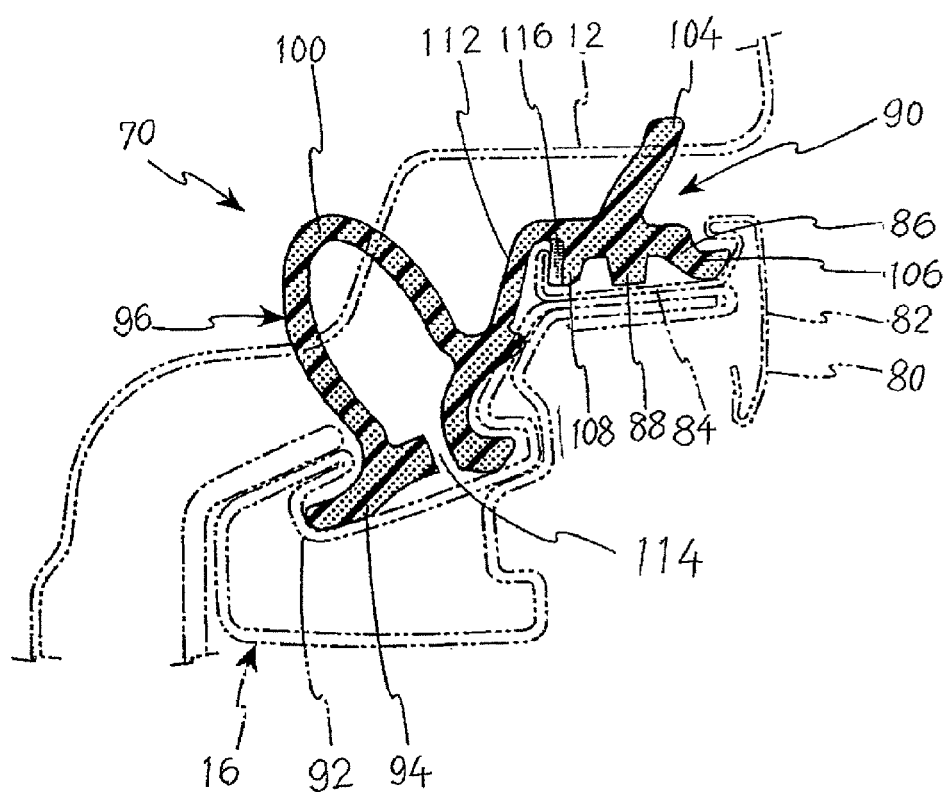
FIG. 8 is a cross-sectional view of an upper side part of a corner section of one embodiment of a door weather strip in accordance with the present invention, which is taken along line 8-8 of FIG. 7.
Figure 9:
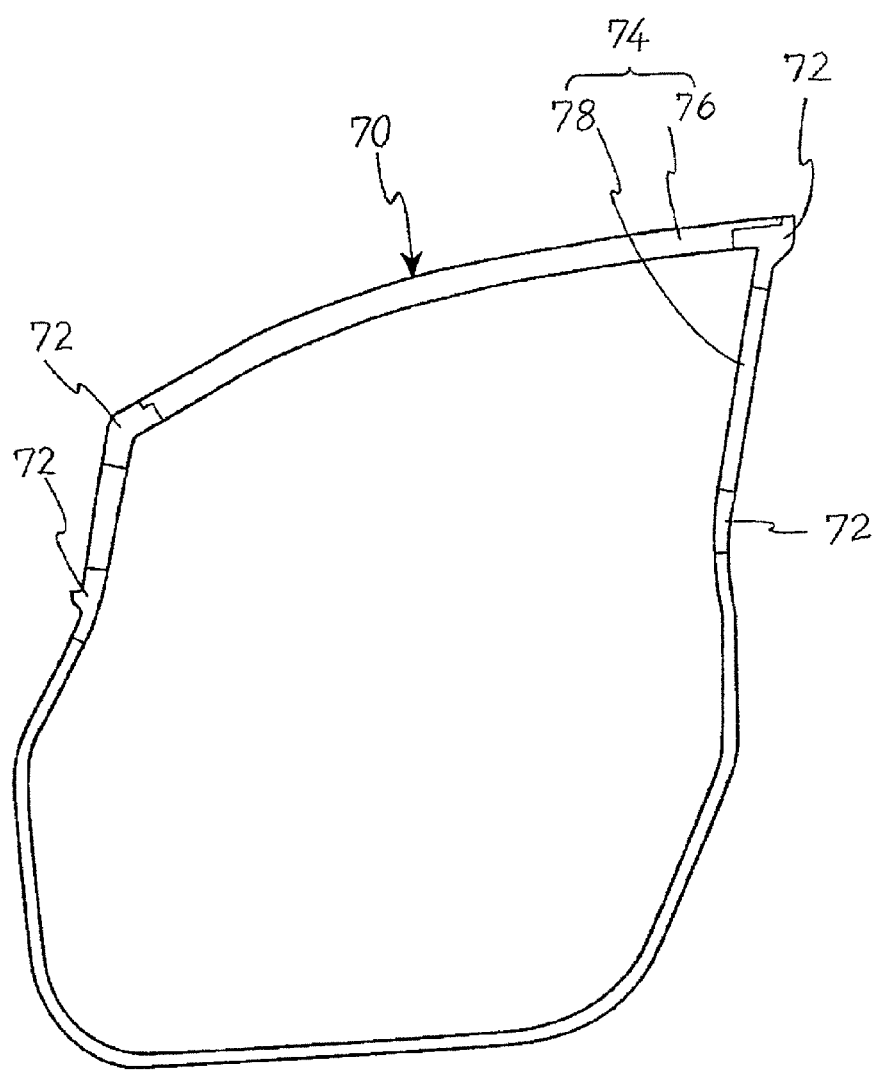
FIG. 9 is a plan view of an entire door weather strip in one embodiment of the present invention.

FIGS. 5 through 9 are views showing the door weather strip 70 in one embodiment in accordance with the present invention. FIG. 9 is a plan view of the door weather strip 70. FIG. 5 is a cross-sectional view taken along line 5-5 of FIG. 7, FIG. 8 is a cross-sectional view of a corner section 72 of the door weather strip 70, which is taken along line 8-8 of FIG. 7. FIGS. 6 and 7 are a rear view and a plan view of the corner section 72 of the door weather strip 70.

As shown in FIG. 9, the door weather strip 70 has straight sections 74 including an upper side section 76 facing an upper side of the door frame 16 and a vertical side section 78 facing a vertical side of the door frame 16, and corner sections 72, each facing a corner of the door frame 16. Each straight section 74 is formed by extrusion into a strip-shaped configuration, and each corner section 72 is formed by molding so as to connect the upper side section 76 and the vertical side section 78 to each other.

First, the attached structure of the straight section 74 of the door weather strip 70 will be explained based on the upper side section 76, for example, with reference to FIG. 5. Next, the attached structure of the corner section 72, particularly the corner section 72 between the upper side section 76 and the rear vertical side section 78 of the front door 10, will be explained with reference to FIGS. 6 through 8. The present invention can be also applied to the attached structure of the corner section 72 between the upper side section 76 and a front vertical side section of the rear door 10.

As shown in FIG. 5, the straight section 74 of the door weather strip 70 of the present embodiment is attached to the door frame 16 and a door molding 80.

The door frame 16 to which the door weather strip 70 is attached is of a so-called hidden type. As shown in FIG. 5, the door frame 16 of a hidden type is arranged such that an exterior end thereof has a narrow width, and is covered with the door molding 80 attached to the outer periphery of the door frame 16 so as not to be exposed.

In the present embodiment, the door molding 80 includes a molding section 82 and a retainer section 84 formed integrally with each other. Alternatively, they may be formed separately and connected to each other. Otherwise, the molding section 82 and the retainer section 84 may be formed separately. The door molding 80 is secured to the end of the door frame 16 by means of rivets, clips, screws, etc.

The molding section 82 has a predetermined width capable of covering the end of the door frame 16, and a lower end edge of the molding section 82 bends like a hairpin. The lower end edge of the molding section 82 thus bending, and an interior surface of the door frame 16 hold a glass run (not shown). As a result, the end of the door frame 16 is covered with the molding section 82 without being exposed, and the glass run is held with the molding section 82 so that an exterior side wall of the door frame 16 can be eliminated, thereby reducing the weight of the door frame 16.

An upper end edge of the molding section 82 bends towards a rear side thereof like a hairpin, similarly to the lower end edge thereof, and is integral with the retainer section 84. The molding section 82 and the retainer section 84 can be formed by bending one piece of a sheet metal of stainless steel, etc.

The retainer section 84 is formed to have a u-shaped cross-section of which a bottom enlarges in a width direction thereof. An interior end edge of the retainer section 84 bends like a hairpin, and a depression is formed in the retainer section 84. Therefore, a later-described exterior base portion 86 of an exterior weather strip 90 can be held with the depression of the retainer section 84.

An exterior side wall of the retainer section 84 is formed integrally with the upper end edge of the molding section 82 on the rear side of the molding section 82.

An interior half of the door frame 16 is formed stepwise downwardly of an exterior half thereof, to which the retainer section 84 is adapted to be attached, to define a channel-shaped retainer section 92 capable of attaching an interior base portion 94 of an interior weather strip 96. The channel-shaped retainer section 92 is formed by bending an outer panel 98 of the door frame 16. Therefore, the interior weather strip 96 can be attached downwardly of the exterior weather strip 90. As a result, the height of the exterior weather strip 90 can be decreased, and consequently, the width of the molding section 82 of the door molding 80 attached to the door frame 16 can be decreased, whereby the appearance of the door frame 16 can be improved.

As shown in FIG. 5, the door weather strip 70 includes the exterior weather strip 90, the interior weather strip 96 and a connection section 112 for connecting the exterior weather strip 90 and the interior weather strip 96 integrally.

The exterior weather strip 90 is attached to the exterior side of a periphery of the door frame 16, namely attached to the retainer section 84 to effect a seal between the door frame 16 and the door opening portion 12 along an exterior end thereof.

The interior weather strip 96 is attached to the interior side of the periphery of the door frame 16, namely attached to the retainer section 92 to effect a seal between the door frame 16 and the door opening portion 12 on an interior side thereof. The interior weather strip 96 includes the interior base portion 94 for attachment to the retainer section 92, and an interior seal portion 100 for contacting and sealing an interior part of the door opening portion 12. As a result, the exterior weather strip 90 and the interior weather strip 96 can effect a double seal.

The interior base portion 94 is formed to have a generally plate-shaped configuration, and both side edges are fitted in the retainer section 92 of the door frame 16 to hold the interior weather strip 96. A core section 102 provided in a central part of the interior base portion 94 is composed of a hard material such as a hard solid rubber.

Therefore, in the extruding and vulcanizing steps, the door weather strip 70 can be prevented from being fed while meandering due to a balance in shrinkage of materials between the exterior weather strip 90 and the interior weather strip 96, and the interior weather strip 96 can be securely held in the retainer section 92. In addition, upon attaching of the door weather strip 70 to the door frame 16, the door weather strip 70 can be prevented from elongating in a longitudinal direction thereof.

Alternatively, the interior weather strip 96 can be bonded to the door frame 16 by bonding a double-sided adhesive tape to a rear surface of the interior base portion 94. In this case, an end surface of the door frame 16 can be made flat so that no retainer section 92 is needed in the door frame 16 to facilitate the production of the door frame 16.

The interior seal portion 100 is formed tubular, and when the vehicle door is closed, the interior seal portion 100 contacts a protrusion provided on an interior side of the door opening portion 12 to effect a seal between the door opening portion 12 and the door frame 16. By virtue of the tubular configuration, the interior seal portion 100 contacts the door opening portion 12 with an increased contacting area to improve the sealing properties.

The interior seal portion 100 can be also formed into a lip-shaped configuration. Where the interior seal portion 100 is formed into a lip-shaped configuration, a closing force of the vehicle door can be decreased.

In addition, since the retainer section 92 of the door frame 16 is formed downwardly of the retainer section 84 of the door molding 80, a gap between the door opening portion 12 and the door fame 16 can be decreased where the interior seal portion 100 is made great.

As shown in FIG. 5, in the upper side section 76 and an upper side part of the corner section 72, the exterior weather strip 90 includes the exterior base portion 86 and the exterior seal portion 104. The exterior base portion 86 has an exterior engaging part 106 and an interior engaging part 108. The exterior engaging part 106 and the interior engaging part 108 contact the retainer section 84, and the exterior engaging part 106 as an exterior side end is closely inserted in the depression of the retainer section 84.

The exterior seal portion 104 has a lip-shaped configuration. The lip-shaped exterior seal portion 104 projects from the exterior base portion 86 of the exterior weather strip 90 towards an exterior end edge of the door opening portion 12.

When the vehicle door is closed, the exterior seal portion 104 can close a gap between the door opening portion 12 and an upper end of the door molding 80. By virtue of the lip-shaped configuration, the exterior seal portion 104 readily flexes to decrease the force required for closing the vehicle door.

A core section 110 is provided in the exterior base portion 86 of the exterior weather strip 90, and is composed of a hard material such as a hard solid rubber. By virtue of the core sections 102 and 110 composed of a hard material, the door weather strip 70 can be prevented from elongating or stretching, and can be securely held with the retainer section 84 upon attaching of the door weather strip 70 to the door frame 16. As a result, the exterior seal portion 104 can contact a predetermined position to achieve sufficient sealing properties.

The hard material for the core section 110 of the exterior weather strip 90 may be similar to that of the core section 102 of the interior weather strip 96, and can be a hard rubber with a JIS hardness of 85°~95°. Where the hard rubber is used, the core sections 102 and 110 can be formed by molding simultaneously with other parts composed of a soft rubber.

When a solid material of an EPDM rubber or a thermoplastic olefin elastomer is used as the hard material, products exhibiting good weather resistance can be obtained.

Surfaces of the exterior base portion 86 and the interior base portion 94 can be covered with sponge members. In this case, where surfaces of the retainer sections 84 and 92 are uneven because of attaching holes, etc. provided therein, the exterior base portion 86 and the interior base portion 94 can closely contact the retainer sections 84 and 92 according to the unevenness in the surfaces of the retainer sections 84 and 92, thereby improving the sealing properties. These sponge members can be composed of a foamed EPDM rubber or a foamed thermoplastic olefin elastomer.

The door weather strip 70 is composed of a sponge material except for parts composed of a hard material. More specifically, the exterior seal portion 104, the interior seal portion 100, both side edges of the interior base portion 94 and the connecting section 112 are composed of a sponge material of an EPDM rubber or a thermoplastic olefin elastomer. Where the hard material is composed of an EPDM rubber or a thermoplastic olefin elastomer, the door weather strip 70 is entirely composed of an olefin material so that by subjecting it to the pulverizing step, it can be recycled for reusing.

Next, the corner section 72 of the door weather strip 70 will be explained with reference to a rear-side corner section 72 of a front door, for example.

As shown in FIG. 9, the corner section 72 of the door weather strip 70 is formed by molding to join the upper side section 76 and the vertical side section 78 to each other. The corner section 72 includes the exterior weather strip 90 and the interior weather strip 96, similarly to the upper side section 76.

The exterior weather strip 90 includes the exterior base portion 86 and the exterior seal portion 104.

In order to join the upper side section 76 to the corner section 72, the exterior weather strip 90 and the interior weather strip 96 of each of the upper side section 76 and the vertical side section 78 are held with a mold adapted to mold the corner section 72, and a sponge material for forming the corner section 72 is injected into the mold, thereby molding the corner section 72 and joining the upper side section 76 and the vertical side section 78 to the corner section 72.

As shown in FIG. 8, in the corner section 72, the door weather strip 70 has the exterior weather strip 90, the interior weather strip 96 and the connecting section 112, similarly to the upper side section 76, but is entirely composed of a sponge material.

The interior weather strip 96 includes the interior base portion 94 and the tubular interior seal portion 100. The interior base portion 94 is attached to the retainer section 92 of the door frame 16, and has a through hole 114 in a central part thereof for removing a core upon molding. When the vehicle door is closed, the interior seal portion 100 contacts and seals the door opening portion 12.

The exterior weather strip 90 includes the exterior base portion 86 adapted to be attached to the retainer section 84 of the door molding 82, and the lip-shaped exterior seal portion 104 adapted to contact the door opening portion 12 upon closing of the vehicle door. When the exterior base portion 86 is attached to the door molding 80, the exterior weather strip 90 becomes stable so that the exterior seal portion 104 can securely contact and seal the exterior side of the door opening portion 12.

As shown in FIG. 6, a reinforcing rib 88 is formed in a rear surface of the exterior base portion 86 of the corner section 72, which is adapted to be attached to the upper side of a corner of the door frame 16. The reinforcing rib 88 is formed of a sponge material integrally with the exterior base portion 86. The reinforcing rib 88 can have a lattice-like configuration. With this arrangement, the exterior base portion 86 can exhibit sufficient strength in both the longitudinal direction and the width direction thereof so that the rigidity of the exterior base portion 86 can be ensured without cutting most part of the extruded portion of the corner section 72, nor embedding any insert therein. In addition, in the corner section 72, the exterior base portion 86 of the exterior weather strip 90 can be prevented from coming off the door frame 16.

The reinforcing rib 88 can have a configuration other than that shown in FIG. 6. For example, the reinforcing rib can include a plurality of reinforcing ribs that extend in the width-wise direction on the surface of the exterior base portion 86. In this case, the exterior base portion 86 can exhibit sufficient strength in the width-wise direction thereof. As a result, the exterior base portion 86 of the exterior weather strip 90 can be prevented from coming off the door frame 16 of the corner of the vehicle door.

As shown in FIG. 8, in the upper side section 76 and an upper side part of the corner section 72, the exterior engaging part 106 and the interior engaging part 108 can be continuously formed in the longitudinal direction of the exterior base portion 86 so as to project downwardly from both side edges of the rear surface thereof towards the retainer section 84 of the door molding 80.

In this case, the exterior engaging part 106 and the interior engaging part 108 can improve the rigidity of the exterior base portion 86, and when the exterior base portion 86 is attached to the door frame 16 or the door molding 80, the exterior engaging part 106 and the interior engaging part 108 are engaged with the door frame 16 or the door molding 80 to contact and seal the same, thereby improving the sealing properties.

The interior engaging part 108 has an end that includes a joint to the connecting section 112. In the corner section 72 a sub-reinforcing rib 116 can be formed along an interior side surface of interior engaging part 108. This sub-reinforcing rib 116 is composed of a plurality of ribs, each rib projecting from root of the joint of the interior engaging part 108. With this arrangement, the rigidity of the interior engaging part 108 can be enhanced, and consequently, the interior part 108 can be engaged with the door frame 16 or the door molding 80 more securely.

As shown in FIG. 6, a caulking sponge 118 can be attached to a corner part of the interior base portion 94, which is adapted to be fitted in the retainer section 92. In this case, the sealing properties between the interior base portion 94 and the retainer section 92 in the corner section 72 can be improved.

Since the corner section 72 of the door weather strip 70 is formed by molding, it is entirely composed of a sponge material. It is preferable that the Young's modulus of this sponge material ranges from 0.84 to 0.88, and that the specific gravity thereof ranges from 0.61 to 0.65. Where the specific gravity ranges from 0.61 to 0.65, the flexibility of the corner section 72 of the door weather strip 70 can be enhanced, and the weight thereof can be reduced to contribute to the weight reduction of the motor vehicle.

And where the Young's modulus of this sponge material ranges from 0.84 to 0.88, this sponge material can exhibit sufficient rigidity and elastic modulus, thereby preventing the exterior base portion 86 from deforming to come off a sash of the corner of the door frame 16.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:
1. A door weather strip for sealing between a door of a motor vehicle and a door opening portion of a vehicle body of the motor vehicle, the door weather strip being adapted to be attached to an outer periphery of a door frame of the door and comprising:

an upper side section formed by extrusion and adapted to be attached to an upper side of the door frame, a vertical side section formed by extrusion and adapted to be attached to a vertical side of the door frame, and a molded corner section adapted to join said upper side section and said vertical side section to each other, wherein each of said upper side section and an upper side part of said corner section includes an exterior weather strip adapted to be attached to an exterior part of the door frame to provide a seal with an exterior part of the door opening portion, an interior weather strip adapted to be attached to an interior part of the door frame to provide a seal with an interior part of the door opening portion, and a connecting section for integrally connecting said exterior weather strip and said interior weather strip to each other, each of said exterior weather strips includes an exterior base portion made of a sponge material for attachment to one of the door frame and a door molding and includes an exterior seal portion for contacting the door opening portion when the door is closed, and each of said interior weather strips includes an interior base portion made of the sponge material for attachment to the door frame and includes an interior seal portion for contacting the door opening portion when the door is closed, said door weather strip further comprises a reinforcing rib formed in a rear surface of said exterior base portion of said upper side part of said corner section, said exterior base portion of each of said upper side section and said upper side part of said corner section has an exterior engaging part and an interior engaging part both formed of the sponge material, said exterior and interior engaging parts of the upper side part of said corner section extend along a longitudinal direction of said rear surface of said exterior base portion and project downwardly and said exterior and interior engaging parts of the upper side section extend along a longitudinal direction of said upper side section and project downwardly, and sub-reinforcing ribs are formed along an interior side surface of said interior engaging part of said exterior base portion of said upper side part of said corner section, said interior engaging part of said upper side part of said corner section having an end comprising a joint connected to said connecting section of said upper side part of said corner section, wherein each of said ribs projects from a root of said joint.

2. The door weather strip as claimed in claim 1, wherein said reinforcing rib has a lattice-shaped configuration.

3. The door weather strip as claimed in claim 1, wherein said reinforcing rib includes a plurality of ribs each extending in a width direction of said rear surface of said exterior base portion of said upper side part of said corner section.

4. The door weather strip as claimed in claim 1, wherein said corner section is composed of the sponge material and has a Young's modulus ranging from 0.84 to 0.88 and a specific gravity ranging from 0.61 to 0.65.

5. The door weather strip as claimed in claim 1, wherein each of said exterior seal portions is composed of the sponge material and has a lip-shaped configuration, and each of said interior seal portions is composed of the sponge material and has a tubular configuration.

6. The door weather strip as claimed in claim 1, wherein at least one part of said exterior base portion of said upper side section and said interior base portion of said upper side section is composed of a solid material.

* * * * *